(12) United States Patent
Ganesan et al.

(10) Patent No.: US 11,595,064 B2
(45) Date of Patent: Feb. 28, 2023

(54) CLOCK RECOVERY AND CABLE DIAGNOSTICS FOR ETHERNET PHY

(71) Applicant: Texas Instruments Incorporated, Dallas, TX (US)

(72) Inventors: Raghu Ganesan, Bengaluru (IN); Saravanakkumar Radhakrishnan, Aruppukottai (IN); Gaurav Aggarwal, Rohini Delhi (IN); Rallabandi V Lakshmi Annapurna, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/401,398

(22) Filed: Aug. 13, 2021

(65) Prior Publication Data

US 2022/0052714 A1 Feb. 17, 2022

(30) Foreign Application Priority Data

Aug. 13, 2020 (IN) .............................. 202041034802
Sep. 2, 2020 (IN) .............................. 202041037768

(51) Int. Cl.
*H04B 1/04* (2006.01)
*H04L 25/03* (2006.01)
*H04L 25/02* (2006.01)
*H04B 1/30* (2006.01)

(52) U.S. Cl.
CPC ............ *H04B 1/04* (2013.01); *H04L 25/0202* (2013.01); *H04L 25/03961* (2013.01); *H04B 2001/045* (2013.01); *H04B 2001/0441* (2013.01); *H04B 2001/305* (2013.01)

(58) Field of Classification Search
CPC .............. H04B 1/04; H04B 2001/0441; H04B 2001/045; H04B 2001/305; H04L 25/0202; H04L 25/03961; H04L 25/0204; H04L 25/0224
See application file for complete search history.

(56) References Cited

U.S. PATENT DOCUMENTS

| | | | |
|---|---|---|---|
| 7,254,198 B1* | 8/2007 | Manickam | H04L 25/03057 375/348 |
| 10,135,641 B1* | 11/2018 | Sedarat | H04L 25/03057 |
| 2006/0274620 A1* | 12/2006 | Haddad | H03G 3/3052 369/53.31 |
| 2007/0223571 A1* | 9/2007 | Viss | H04L 25/03057 375/233 |
| 2010/0177427 A1* | 7/2010 | Dahle | G11B 5/035 |
| 2010/0177816 A1* | 7/2010 | Malipatil | H04L 25/03343 375/232 |
| 2013/0094561 A1* | 4/2013 | Raphaeli | H04L 25/03057 375/233 |

(Continued)

*Primary Examiner* — Jean B Corrielus
(74) *Attorney, Agent, or Firm* — Valerie M. Davis; Frank D. Cimino

(57) ABSTRACT

A receiver circuit includes an analog-to-digital converter (ADC), a decision feedback equalizer (DFE), a slicer, and a timing error detector (TED). The DFE is coupled to the ADC, and includes a first tap and a second tap. The slicer is coupled to the DFE. The TED is coupled to the slicer. The TED is configured to initialize timing of a sampling clock provided to the ADC while initializing the second tap of the DFE and holding the first tap of the DFE at a constant value.

25 Claims, 8 Drawing Sheets

(56) References Cited

U.S. PATENT DOCUMENTS

2015/0256364 A1\* 9/2015 Mobin .............. H04L 25/03057
　　　　　　　　　　　　　　　　　　　　　　375/233
2021/0288836 A1\* 9/2021 Ganesan ........... H04L 25/03267
2022/0286329 A1\* 9/2022 Navid ..................... H04L 27/08

\* cited by examiner

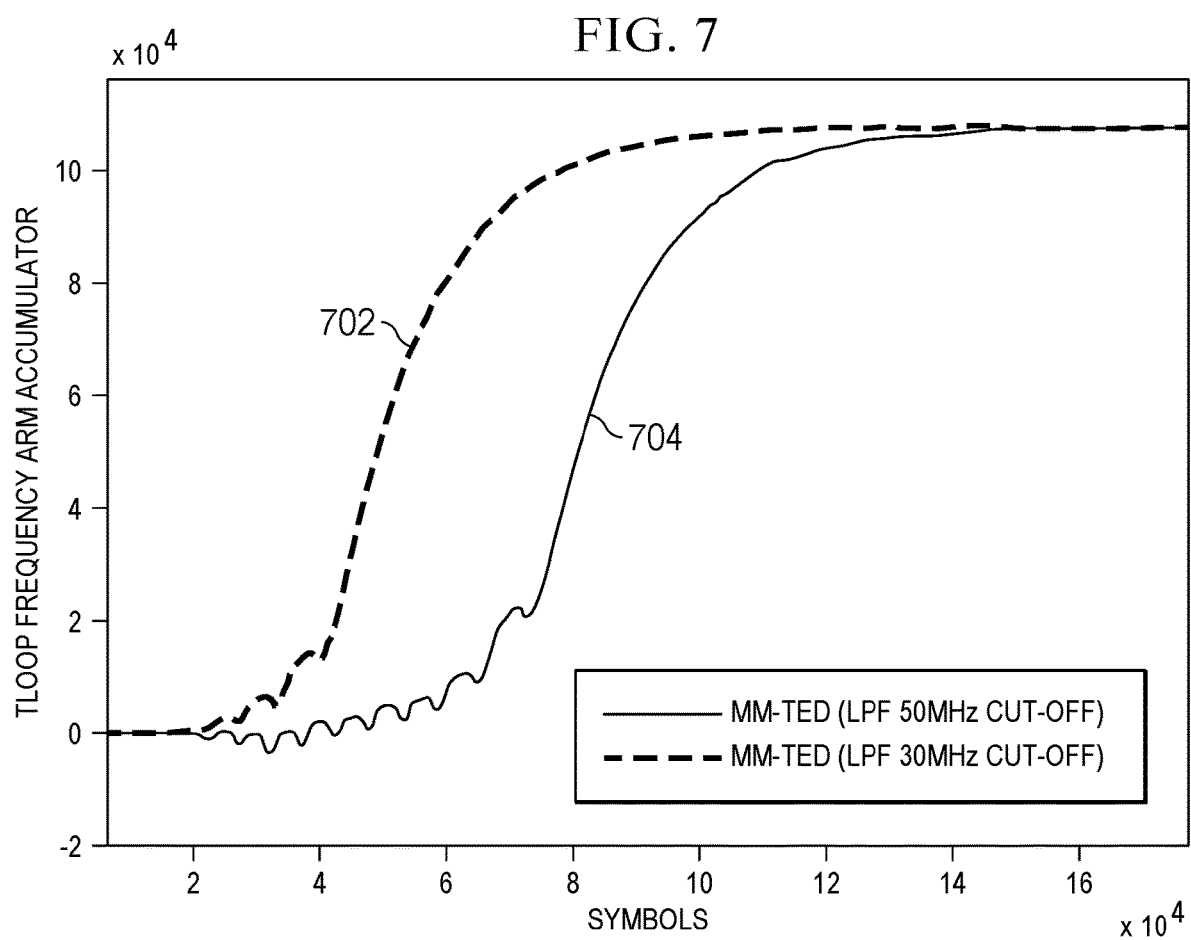

CHANNEL ESTIMATE ($H_{est}$) FOR N = 1024

FIRST DFE TAP ACROSS CABLE LENGTH

ALCD PARAMETER PROFILE

CLOCK RECOVERY AND CABLE DIAGNOSTICS FOR ETHERNET PHY

CROSS-REFERENCE TO RELATED APPLICATIONS

This application claims priority to India Provisional Application 202041034802, filed Aug. 13, 2020, entitled "Robust Clock Recovery Methods for Short Channels," and India Provisional Application 202041037768, filed Sep. 2, 2020, entitled "Method for Cable Diagnostics During Active Link," each of which is hereby incorporated by reference in its entirety.

BACKGROUND

Ethernet is used to provide communication in a wide variety of applications. For example, in automotive applications, Ethernet is used to provide communication for safety systems and infotainment systems. In such systems, Ethernet communication reliability is important.

SUMMARY

In one example, a receiver circuit includes an analog-to-digital converter (ADC), a first adder, a second adder, a slicer, a decision feedback equalizer (DFE), a timing error detector (TED), and a multiplexer. The ADC includes an output. The first adder includes a first input, a second input, and an output. The first input of the first adder is coupled to the output of the ADC. The second adder includes in first input, a second input, and an output. The first input of the second adder is coupled to the output of the first adder. The slicer includes an input and an output. The input of the slicer is coupled to the output of the second adder. The DFE includes a first tap and a second tap. The first tap includes an input coupled to the output of the slicer, and an output coupled to the second input of the second adder. The second tap includes an input coupled to the output of the slicer, and an output coupled to the second input of the first adder. The TED includes a first input and a second input. The first input of the TED is coupled to the output of the slicer. The multiplexer includes a first input coupled the output of the first adder, a second input coupled to output of the second adder, and an output coupled to the second input of the TED.

In another example, a receiver circuit includes an ADC, a DFE, a slicer, and a TED. The DFE is coupled to the ADC, and includes a first tap and a second tap. The slicer is coupled to the DFE. The TED is coupled to the slicer. The TED is configured to initialize timing of a sampling clock provided to the ADC while initializing the second tap of the DFE and holding the first tap of the DFE at a constant value.

In a further example, a receiver circuit includes an ADC, a DFE, an automatic gain control (AGC) circuit, and an active link cable diagnostics (ALCD) circuit. The DFE is coupled to the ADC. The AGC circuit is coupled to the ADC, and is configured to set an amplitude of the input signal provided to the ADC. The ALCD circuit is coupled to the DFE and the AGC circuit, and is configured to determine a cable length based on a gain value provided by the AGC circuit and a coefficient of the DFE.

In a yet further example, a method includes digitizing a signal using an ADC. Taps 2-N of an N tap DFE coupled to the ADC are initialized. ADC sample timing is initialized while initializing taps 2-N of the DFE. Tap 1 of the DFE is initialized after initialization of the ADC sample timing is complete.

BRIEF DESCRIPTION OF THE DRAWINGS

For a detailed description of various examples, reference will now be made to the accompanying drawings in which:

FIG. 7 shows a graph of timing initialization time with and without changing a low-pass corner frequency during timing initialization.

The same reference numbers or other reference designators are used in the drawings to illustrate the same or similar (by function and/or structure) features.

DETAILED DESCRIPTION

Figure 1:
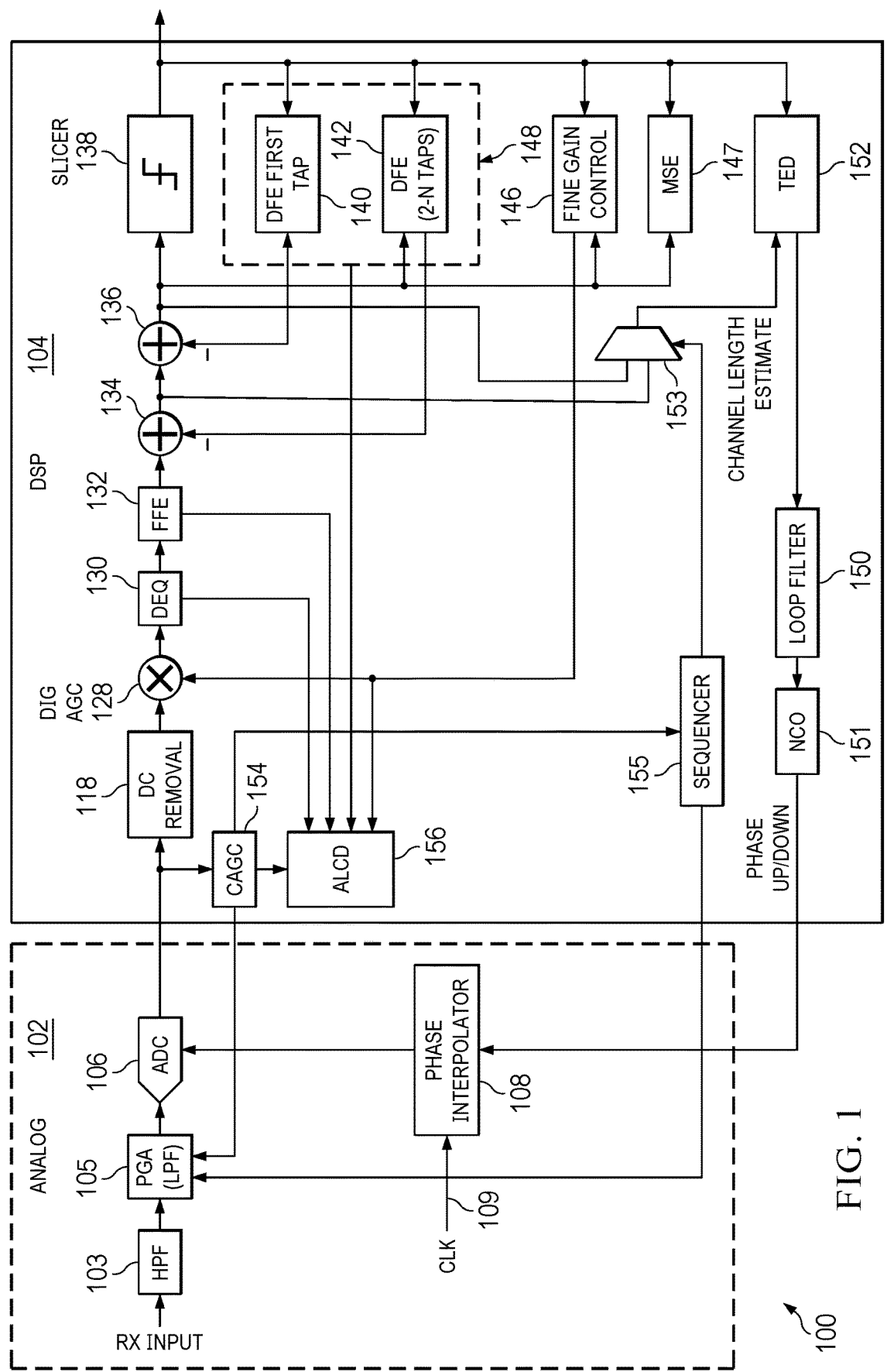
FIG. 1 is a block diagram for an example receiver physical layer circuitry with a first tap of the decision feedback equalizer (DFE) decoupled during timing initialization.

In high-speed communication networks, such as Ethernet, timing signals may be embedded in the symbol stream, rather than provided as discrete signals in addition to the symbol stream. Receiver circuitry extracts timing information from a received signal stream to set symbol stream sample timing. Generation of sample timing based on analysis of the received symbol stream is referred to as dock recovery or timing recovery.

Receiver circuitry applies equalization to the received symbol stream to reverse the effects of the channel (e.g. the transmission medium, such as a cable, between the transmitter and the receiver) traversed by the symbol stream. Equalization and clock recovery may be initialized during a start-up initialization interval. The equalizers provided in the receiver may include a decision feedback equalizer (DFE) to correct for post-cursor inter-symbol interference (ISI). Post-cursor ISI refers to ISI resulting from a later transmitted symbol. Symbols equalized by the DFE may be used to initialize clock recovery. However, interaction between the DFE and clock recovery can result in long settling times, improper convergence, or failure to converge for the DFE and/or the clock recovery, particularly with short channel lengths (short cable lengths). As a result, the communication link between devices may be unreliable or take excessive time to establish.

The receiver circuits of some example embodiments improve communication reliability and communication link settling time by decoupling the first tap of the DFE from clock recovery when the symbol stream is received via a short channel. Clock recovery may be initialized without operation of the first DFE tap, and after clock recovery is initialized, the first DFE tap may be initialized. By decoupling the first tap of the DFE during initialization of clock recovery, interference between the DFE and clock recovery is reduced, and, in turn, clock recovery and DFE settling times are reduced, and failure to converge and improper convergence are avoided.

Cables are one component of serial communication systems, e.g., Ethernet communication systems. Ethernet receivers may include diagnostic circuitry to identify faulty or degraded cables. For example, some Ethernet receivers include a time domain reflectometer to detect cable faults. However, use of a time domain reflectometer requires suspension of normal communication operations, which may be undesirable. Some receivers include active link cable diagnostics to allow estimation of cable quality during normal operation of the communication link. Active link cable diagnostics estimate cable length. Some receivers implementing active cable length diagnostics use received signal energy to estimate cable length. For example, the receiver includes automatic gain control to compensate for cable attenuation, and the gain applied to received signal corresponds to the attenuation of the received signal, which is indicative of cable length. However, estimation of cable length based only on attenuation, and not on ISI, limits estimate accuracy. For example, based on attenuation alone, cable length estimate accuracy may be no better than ±10 meters.

The receivers of some example embodiments include active link cable diagnostics to estimate cable quality during normal operation of a communication link. The receivers provide improved cable length estimation accuracy by using equalization coefficients in conjunction with gain information to estimate cable length. Channel response based on gain information and filter coefficients provides cable length estimation with accuracy of about ±3 meters in some implementations.

FIG. 1 is a block diagram for example receiver physical layer circuitry 100. Embodiments of the receiver physical layer circuitry 100 may be applied in wireline receivers, such as Ethernet receivers, or in wireless receivers (such as cellular phone receivers and 5G receivers). The receiver physical layer circuitry 100 includes an analog front-end circuit 102 and a digital signal processing circuit 104. The analog front-end circuit 102 receives transmitted signals (e.g. at the RX INPUT) via the communication channel (not shown) and digitizes the received signals for processing by the digital signal processing circuit 104. The digital signal processing circuit 104 processes the digitized signals to compensate for the channel through which the signals pass to the digital signal processing circuit 104. The output of slicer 138 (e.g. the output of receiver physical layer circuitry 100) can be utilized to process/manipulate/use the digital representation of the received analog signal.

The analog front-end circuit 102 includes a high-pass filter 103, a programmable gain amplifier 105, an analog-to-digital converter (ADC) 106, and a phase interpolator 108. The high-pass filter 103 limits the low-frequency content of the receiver input signal to reduce baseline wander in the signal to be digitized by the ADC 106. The programmable gain amplifier 105 is coupled to the high-pass filter 103. The programmable gain amplifier 105 adjusts the gain applied to the filtered receiver input signal to bring the signal amplitude within a selected amplitude range for digitization by the ADC 106. The selected amplitude range may be, for example, in a range of one-half to three-quarters of ADC full-scale or other range that allows sufficient ADC headroom and dynamic range. The programmable gain amplifier 105 may also, include a low-pass filter that limits the high-frequency content of the receiver input signal provided to the ADC 106 for digitization. A corner frequency of the low-pass filter may be adjustable to select the signal frequencies presented to the ADC 106. The ADC 106 may include one or more ADCs, which may be, for example, flash ADCs, pipeline ADCs, or ADCs based on voltage-to-delay technology (e.g. ADCs based on comparators/delays that work on the principal of comparisons based on signal delay as opposed to signal magnitudes).

The sample timing of the ADC 106 is controlled by a clock signal 109. The clock signal 109 may be provided by an oscillator circuit, such as a phase-locked loop. The phase interpolator 108 receives the clock signal 109 and adjusts (advances or retards) the phase of the clock signal 109 to set the sample timing of the ADC 106. The phase interpolator 108 may include variable delay circuits to adjust the phase of the clock signal 109.

The digital signal processing circuit 104 includes a coarse automatic gain control (CAGC) circuit 154, a DC removal circuit 118, a multiplier 128, a digital equalizer 130, a feed-forward equalizer (FFE) 132, an adder 134, an adder 136, a slicer 138, a DFE 148, a fine gain control circuit 146, and a timing error detector (TED) 152.

The CAGC circuit 154 analyzes the amplitude of signal output by the ADC 106 and adjusts the amplitude of the signal output of the ADC 106 to a predetermined range by selecting the gain applied by the programmable gain amplifier 105.

The analog front-end circuit 102 may add DC to the input signal, and any added DC may be amplified by a gain stage of the analog front-end circuit 102 (e.g., a gain stage of the programmable gain amplifier 105). The DC removal circuit 118 removes the DC added by the analog front-end circuit 102 from the digitized input signal received from the ADC 106.

The multiplier 128 is coupled to the output of the DC removal circuit 118. The multiplier 128 multiplies the output of the DC removal circuit 118 by a fine gain multiplier received from the fine gain control circuit 146 to adjust the amplitude of the DC removal circuit output to a predetermined amplitude.

The digital equalizer 130 is coupled to the output of the multiplier 128. The digital equalizer 130 is a digital filter that corrects for ISI caused by the transmission channel. The digital equalizer 130 may be implemented as a finite impulse response filter, and may store multiple sets of coefficients to equalize the channel for a range of cable lengths (e.g., ethernet cable lengths). The coefficients applied by the digital equalizer 130 may be selected based on an estimated cable length.

The FFE 132 is coupled to the output of the digital equalizer 130. The FFE 132 corrects pre-cursor ISI (ISI resulting from a previously transmitted symbol). The FFE 132 may be implemented using a finite impulse response (FIR) filter. The adder 134 is coupled to the output of the FFE 132, and the adder 136 is coupled to the output of the adder 134. The adders 134 and 136 operate with the DFE 148 to reduce post-cursor ISI. The slicer 138 is coupled to the output of the adder 136.

The fine gain control circuit 146, the DFE 148, and the TED 152 are coupled to the slicer 138. The fine gain control circuit 146 compares the signal received at the slicer 138 to a predetermined amplitude value, and sets the gain (or attenuation) provided via the multiplier 128 to bring the slicer input signal to the predetermined amplitude. The fine gain control circuit 146 is coupled to an input of the multiplier 128 to control the fine gain applied to the output of the DC removal circuit 118.

The TED 152 estimates the clock phase from the received signal, and adjusts, in the phase interpolator 108, the phase of the clock signal provided to the ADC 106. The goal of the phase adjustment is to set the edge timing of the clock signal to sample the received input signal at the optimum point. The TED 152 may compute timing adjustment as:

$$\text{ted} = x(n) * \hat{x}(n-1) - x(n-1) * \hat{x}(n) \quad (1)$$

where:
x is slicer 138 input; and
$\hat{x}$ is slicer 138 output;
$x(n) * \hat{x}(n-1)$ may be referred to as $P_1$ (first post-cursor); and
$x(n-1) * \hat{x}(n)$ may be referred to as $P_{-1}$ (first pre-cursor).

The loop filter 150 low-pass filters the output of the TED 152, and the filtered output of the TED 152 is provided to the phase accumulator (NCO) 151. The NCO 151 generates a phase control signal (phase up/down) to adjust the phase of the sampling clock output by the phase interpolator 108.

$P_{-1}$ is used by both the FFE 132 and the TED 152, and the FFE 132 and the TED 152 can therefore interact during initialization. Because $P_{-1}$ is small in Ethernet channels, operation of the FFE 132 may be disabled during initialization of the TED 152 to prevent interaction. Similarly, both the DFE 148 and the TED 152 use $P_1$. Interaction between the DFE 148 and the TED 152 can result in long initialization times or improper initialization. Because the TED 152 uses symbols corrected by the DFE 148, the DFE 148 cannot be totally disabled during initialization of the TED 152.

The DFE 148 is used to cancel post-cursor ISI. The DFE 148 estimates DFE coefficients (or the post-cursor values) and stores the past symbol decisions in a shift register. The coefficients are applied to weight the stored past symbol decisions and recreate the post-cursor ISI to subtract at the input of the slicer 138. The DFE 148 includes multiple (N) taps. More specifically, the DFE 148 includes a first tap 140, and taps 2-N (e.g., second through N taps) 142. The output of the first tap 140 is coupled to the adder 136, and the taps 2-N 142 are coupled to the adder 134 for subtraction of post-cursor ISI from the signal provided to the input of the slicer 138.

By decoupling tap 1 (e.g., DPE First Tap 140) from taps 2-N (e.g., DFE (2-N Taps)) of the DFE 148, the receiver physical layer circuitry 100 allows the TED 152 to be initialized while the first tap 140 is held in a constant state (e.g., the coefficient of the first tap 140 is set to zero and is not updated during TED initialization), and the taps 2-N 142 are initialized and updated. The first tap 140 is initialized after the initialization of the TED 152 is complete. The digital signal processing circuit 104 includes a multiplexer 153 and a sequencer circuit 155. The sequencer circuit 155 controls the initialization of the CAGC circuit 154, the digital equalizer 130, the FFE 132, the fine gain control circuit 146, the DFE 148, and the TED 152. The sequencer circuit 155 may be implemented as a state machine, a microcontroller executing firmware, dedicated digital circuitry, etc. The multiplexer 153 includes an input coupled to the output of the adder 134, an input coupled to the output of the adder 136, a control input coupled to an output of the sequencer circuit 155, and an output coupled to the TED 152. To initialize the TED 152 when the receiver physical layer circuitry 100 is receiving input signal via a short cable, the sequencer circuit 155 sets the multiplexer 153 to route the output of the adder 134 to the TED 152. The length of the cable coupled to the receiver physical layer circuitry 100 is determined based on the gain selected by the CAGC circuit 154. For example, a gain less than a threshold value (a threshold gain) indicates a short cable, and a gain greater than the threshold value indicates a long cable. The sequencer circuit 155 is coupled to the CAGC circuit 154 for receipt of the gain value selected by the CAGC circuit 154. In some implementations of the digital signal processing circuit 104, when a short cable is detected, the sequencer circuit 155 initializes the TED 152 based on taps 2-N 142 (while the first tap 140 is frozen), and initializes the first tap 140 after initialization of the TED 152 is complete. For example, the sequencer circuit 155 sets the multiplexer 153 to route the output of the adder 134 to the TED 152 for use in initialization when a short cable is detected. When using a short cable, the coefficient of the first tap 140 is small and the TED 152 can be initialized without the first tap 140, thereby reducing the dependency between the DFE 148 and the TED 152, reducing the time needed to initialize the TED 152, and avoiding a wrong state in the first tap 140.

Figure 2:
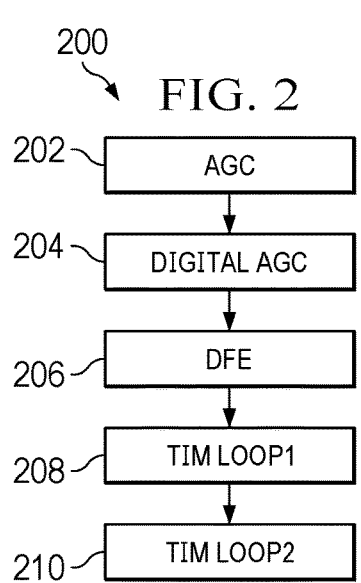
FIG. 2 is a flow diagram for a method for timing and DFE initialization with a first tap of the DFE decoupled during timing initialization.

FIG. 2 is a flow diagram for a method 200 for timing and DFE initialization with a first tap 140 of the DFE 148 decoupled during timing initialization. Though depicted sequentially as a matter of convenience, at least some of the actions shown can be performed in a different order and/or performed in parallel. Additionally, some implementations may perform only some of the actions shown. Operations of the method 200 may be performed by an implementation of the receiver physical layer circuitry 100.

In block 202, the CAGC circuit 154 analyzes the amplitude of signal output of the ADC 106 and adjusts the amplitude to a predetermined range by providing a coarse gain control signal to the programmable gain amplifier 105. The programmable gain amplifier 105 adjusts the gain applied to the received input signal to bring the signal amplitude within the predetermined range for digitization by the ADC 106. The predetermined range may be, for example, in a range of one-half to three-quarters of ADC full-scale or other range that allows sufficient ADC headroom and dynamic range.

In block 204, the fine gain control circuit 146 analyzes the amplitude of signal input to the slicer 138, and adjusts the amplitude of slicer input to a predetermined range for slicing by providing a fine gain control multiplier value to the multiplier 128 coupled to the output of the ADC 106. The multiplier adjusts the ADC output signal to bring the signal amplitude within the predetermined range.

In block 206, the DFE 148 operates to remove post-cursor ISI from the signal provided to the slicer 138. The taps 2-N 142 operate and are initialized, while the first tap 140 is held at a constant value (i.e., the first tap 140 is not updated).

In block 208, the TED 152 is initialized while the taps 2-N 142 are enabled, and the first tap 140 of the DFE 148 is held at a constant value (the first tap 140 is not enabled). The phase of the clock signal provided to the ADC 106 is adjusted based on a comparison of output of the slicer 138 to output of the adder 134.

In block 210, the first tap 140 is enabled to update and is initialized after the TED 152 is initialized.

Figure 3:
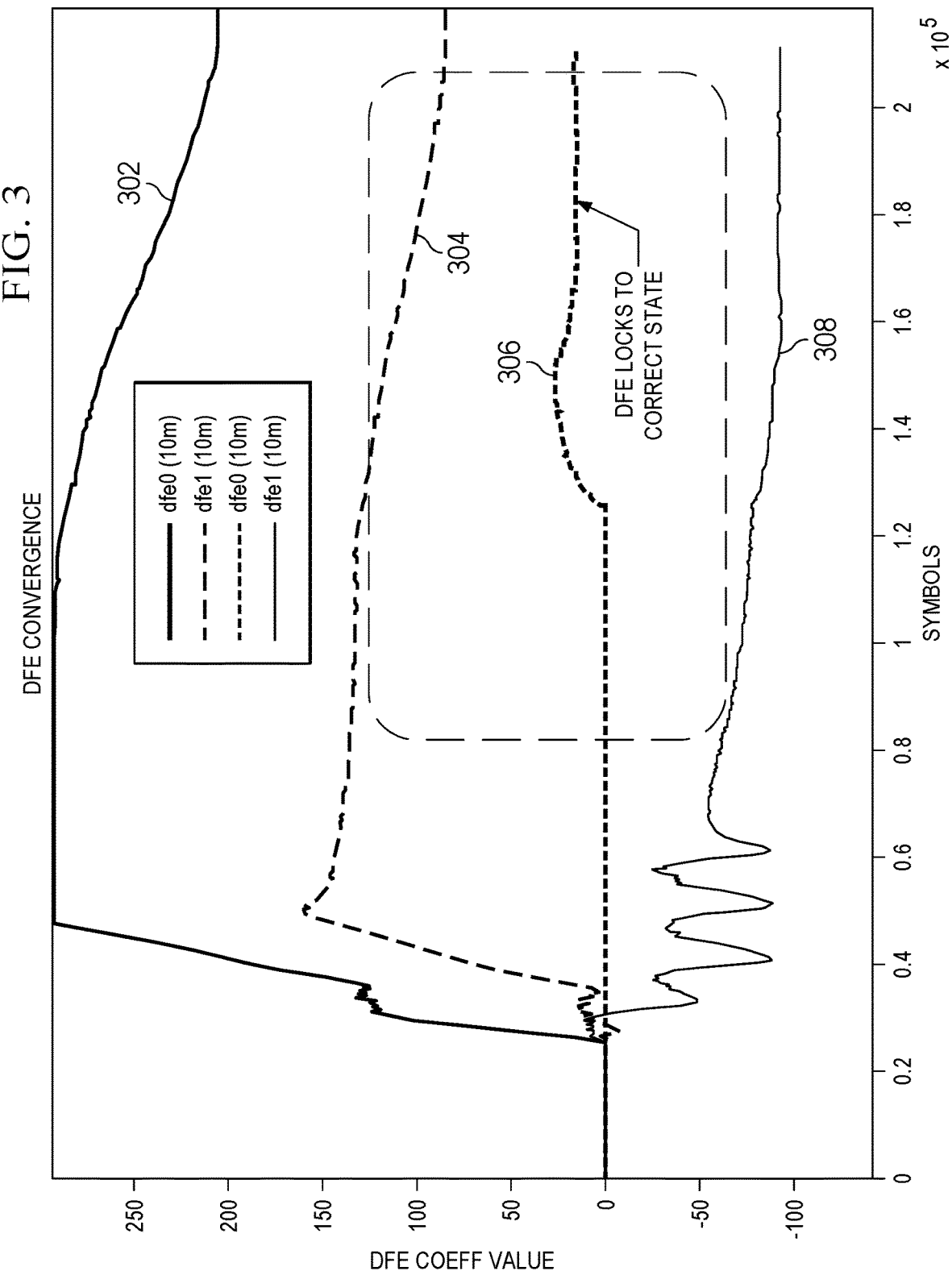
FIG. 3 is a graph of DFE tap initialization with and without decoupling the first tap of the DFE during timing initialization.

FIG. 3 is a graph of DFE tap initialization using a short cable (e.g., 10 meters) with and without decoupling the first tap of the DFE during timing initialization. In FIG. 3, the x-axis represents the number of symbols received, and the y-axis represents DFE coefficient value. The curves 302 and 304 show an example of simultaneous initialization of the TED 152 and the first and second taps of the DFE 148. Each of the two coefficient values starts at zero and settles to a wrong value due to interaction between the DFE and the TED.

The curve 308 shows initialization of the second tap of the DFE 148 simultaneous with initialization of the TED 152, and the curve 306 shows initialization of the first tap 140 after initialization of the TED 152 is complete. The curves 306 and 308 show initialization of the first and second taps of the DFE 148 to a correct state.

Figure 4:
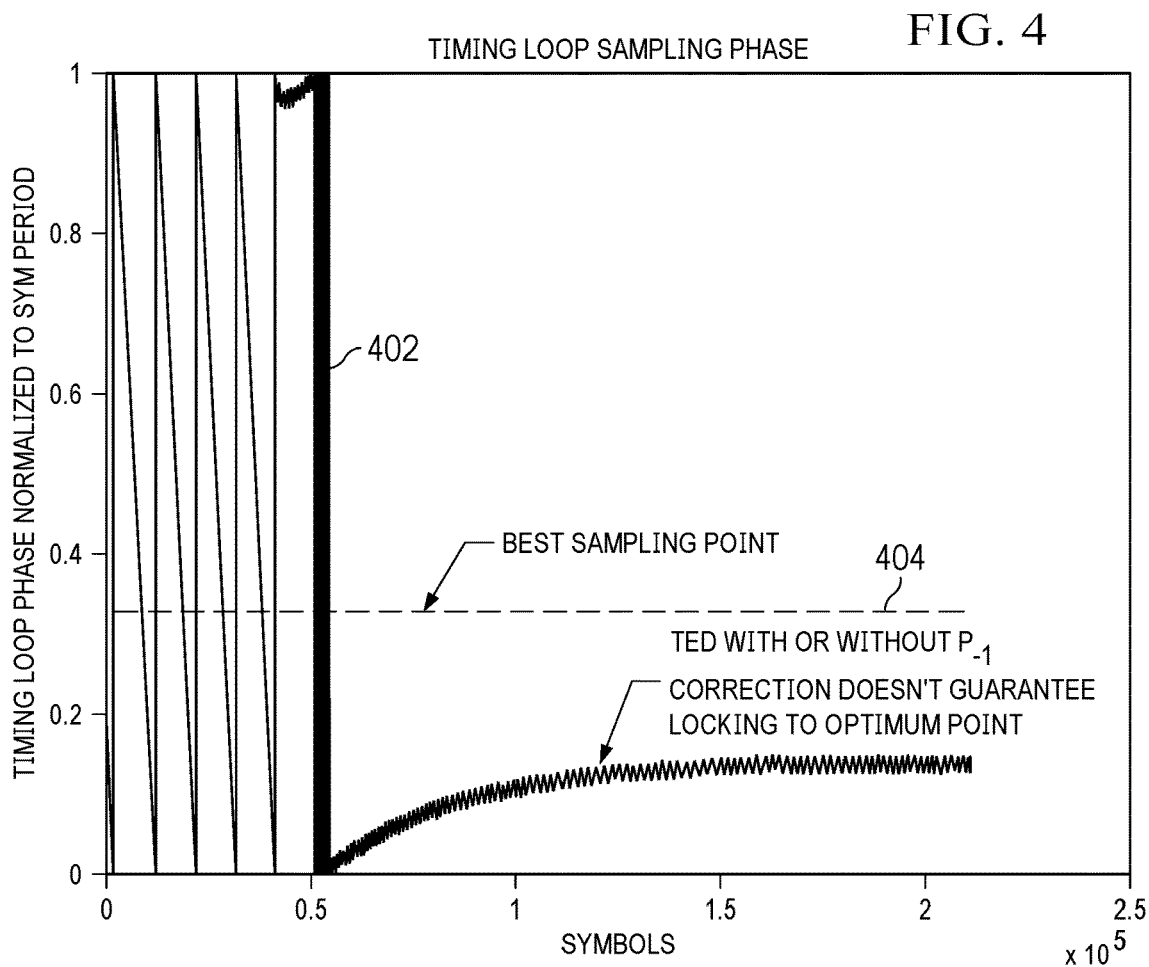
FIG. 4 is a graph of timing initialization in the receiver physical layer circuitry of FIG. 1.

FIG. 4 is a graph of initialization of the TED 152 without the first tap 140. In FIG. 4, the x-axis represents the number of symbols received, and the y-axis represents TED phase adjustment normalized to symbol period. As per equation (1), the TED 152 attempts to identify a sampling point such that $P_1=P_{-1}$. In FIG. 4, The phase adjustment value 402 settles to a value of about 0.15 symbols, which is not optimum. The optimum phase adjustment value is illustrated in FIG. 4 as the line 404 at about 0.32 symbols. Thus, FIG. 4 illustrates that even with decoupling of the first DFE during TED initialization, sampling may be suboptimal. To optimize sampling, and signal-to-noise ratio (SNR), the TED 152 sets the sample timing of the ADC 106 to a peak point of the incoming symbol by applying an offset to the phase adjustment value based on mean squared error (MSE) of the slicer output.

Figure 5:
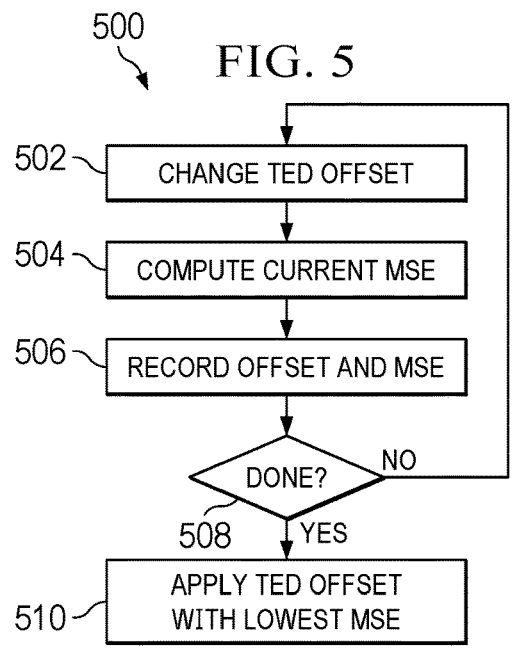
FIG. 5 is a flow diagram for a method for selecting an offset value for initializing timing in the physical layer circuitry of FIG. 1.

FIG. 5 is a flow diagram for a method 500 for selecting an offset value for adjusting sample timing in the receiver physical layer circuitry 100 based on MSE. Though depicted sequentially as a matter of convenience, at least some of the actions shown can be performed in a different order and/or performed in parallel. Additionally, some implementations may perform only some of the actions shown.

In block 502, the TED 152 applies an offset to the timing error computed by the TED 152. The offset may be implemented as a step change in the output value of the TED 152 that is provided to the loop filter 150 for controlling sample timing of the ADC 106. The timing error with applied offset may be expressed as:

$$ted = x(n)*\hat{x}(n-1) - x(n-1)*\hat{x}(n) + \text{offset} \quad (2)$$

In block 504, after addition of the offset in block 502, the MSE circuit 147 computes the MSE of the slicer 138.

In block 506, the TED 152 records (e.g., stores in memory) the MSE value calculated in block 504 and the corresponding offset value applied in block 502.

In block 508, the TED 152 determines whether offset iteration is complete. For example, the TED 152 may iterate from a starting offset value to an ending offset value in predetermined steps. If offset iteration is not complete, then the applied offset value is changed in block 502.

If offset iteration is complete, then, in block 510, the TED 152 selects the recorded offset value that produced the lowest recorded MSE value to apply to the timing error value (sample timing error value) computed by the TED 152.

Another implementation of the method 500 iterates a multiplier A, rather than an offset value.

$$ted = x(n)*\hat{x}(n-1) - \lambda*x(n-1)*\hat{x}(n) \quad (3)$$

Figure 6A:
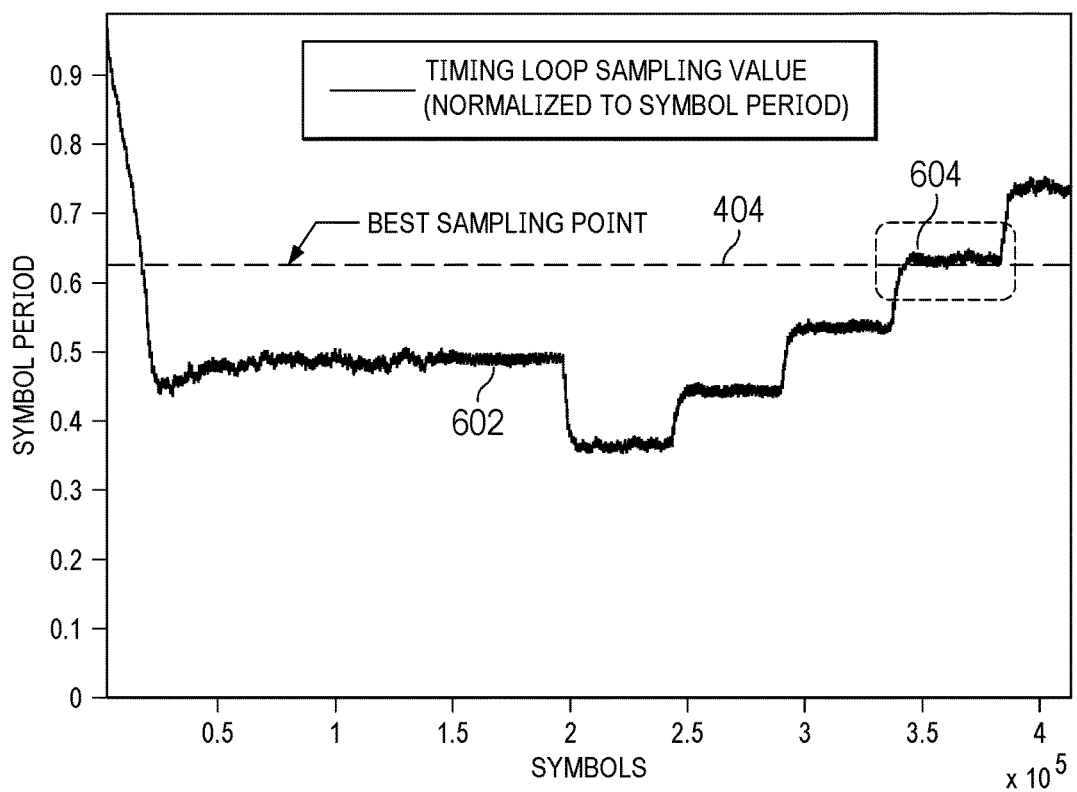
FIGS. 6A and 6B show graphs of timing error and signal-to-noise ratio during selection of an offset value in the method of FIG. 5.
Figure 6B:
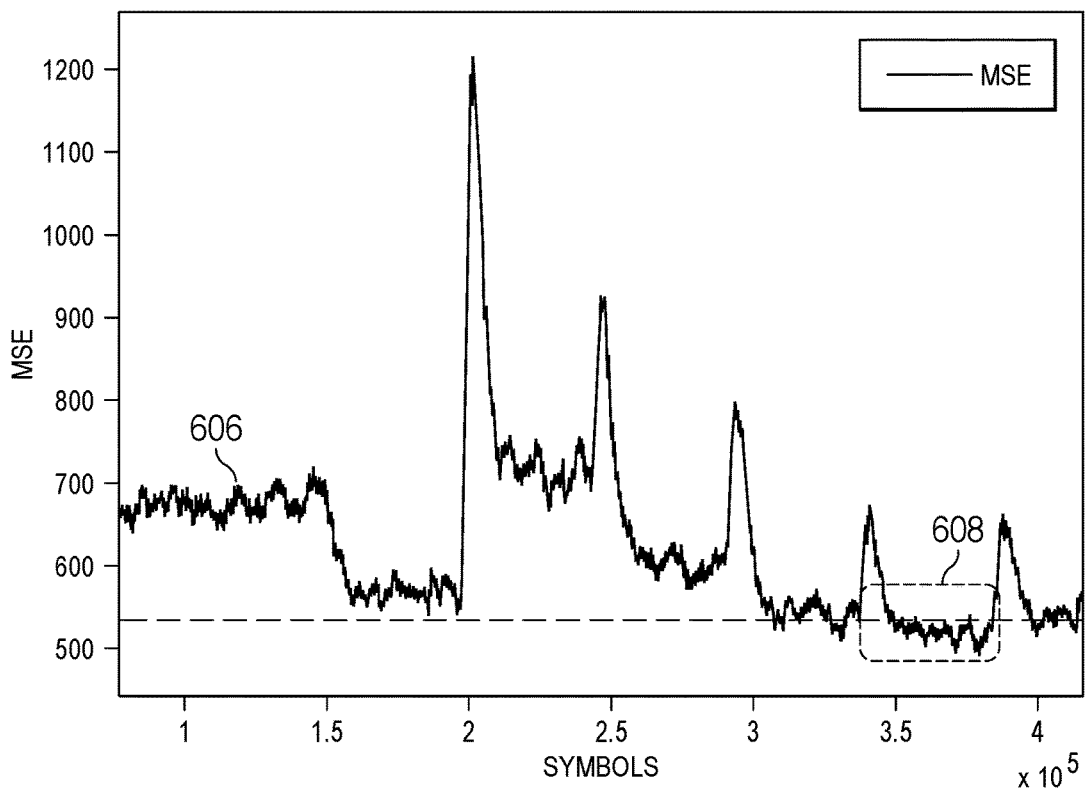

FIGS. 6A and 6B show graphs of timing error and signal-to-noise ratio during selection of an offset value in the method of FIG. 5. FIG. 6A shows iterative addition of offset to the timing error 602 in the TED 152, and FIG. 6B shows the MSE 606 of the slicer 138 with application of the timing error 602. In interval 608 of FIG. 6B, the MSE 606 is minimized, and the offset applied in the timing error step 604 of FIG. 6A is selected as the offset to be applied to the timing error 602 for minimizing SNR.

Initialization of sample timing improves with increased ISI, as is present when using longer cables. Some implementations of the receiver physical layer circuitry 100 improve sample timing initialization by increasing ISI during initialization. ISI may be increased during timing initialization by reducing the low frequency cut off at the input of the ADC 106. Referring again to FIG. 1, the low pass filter of the programmable gain amplifier 105 provides multiple selectable lower corner frequencies. For example, a first corner frequency provided by the programmable gain amplifier 105 is lower than a second corner frequency provided by the programmable gain amplifier 105. As explained herein, the sequencer circuit 155 may determine whether the length of cable coupled to the receiver physical layer circuitry 100 is short or long based on gain selected by the CAGC circuit 154. When the gain is low, indicating a short cable length, the sequencer circuit 155 may select, via a corner frequency select input of the programmable gain amplifier 105, the lower corner frequency of the programmable gain amplifier 105 to increase ISI during initialization of the TED 152. Increasing ISI during initialization, as occurs with a longer cable, improves (reduces) the time needed to initialize ADC sample timing. After initialization of the TED 152 is complete, the sequencer circuit 155 may select the higher corner frequency of the programmable gain amplifier 105.

FIG. 7 shows a graph of timing initialization time with higher and lower low-pass corner frequencies. The x-axis is number of symbols and the y-axis is the accumulated timing adjustment value (e.g., the accumulated timing adjustment value stored in the NCO 151). The curve 702 represents timing initialization with a 30-megahertz (MHz) corner frequency of the programmable gain amplifier 105, and the curve 704 represents timing initialization with a 50 MHz corner frequency of the programmable gain amplifier 105. FIG. 7 shows that, due to the increased ISI, sample timing initializes (settles) substantially faster (about 30,000 symbols faster) with the lower corner frequency of the programmable gain amplifier 105.

To enable cable diagnostics during normal operation, the digital signal processing circuit 104 may include an active link cable diagnostic (ALCD) circuit 156. The ALCD circuit 156 determines cable length by reconstructing an insertion loss profile using coefficients of the digital equalizer 130, the FFE 132, and the DFE 148. Ethernet cables have a linear logarithmic (linear in dB) attenuation profile (at a frequency) across cable length. The attenuation profile can be used to accurately estimate cable length. The ALCD circuit 156 combines gain information provided by the CAGC circuit 154 and the fine gain control circuit 146, and filter information provided by the digital equalizer 130, the FFE 132, and the DFE 148 to estimate channel response. The ALCD circuit 156 estimates cable length based on the channel response (described in further detail below). The ALCD circuit 156 may estimate the channel response as:

$$H_{est}(f)_{dB} = \left(\frac{1}{\text{Gain}} \left| \frac{DFT_N(DFE')}{DFT_N(FFE) * DFT_N(DEQ)} \right| \right)_{db} \quad (4)$$

where $DFT_N$ N point discrete Fourier transform (DFT).

Figure 8A:
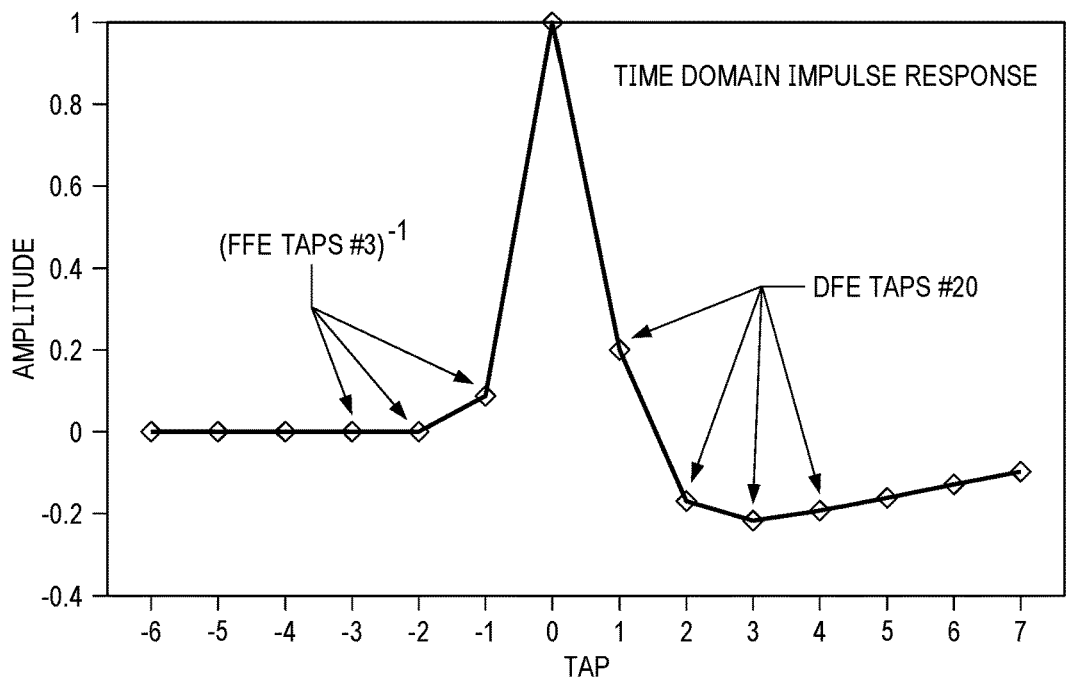
FIGS. 8A and 8B show time domain impulse response and channel estimate for estimating cable length in the physical layer circuitry of FIG. 1.

FIG. 8A shows a time domain impulse response of the channel (the cable) coupled to the receiver physical layer circuitry 100. The y-axis is tap amplitude and the x-axis is tap index. The impulse response includes coefficients of the FFE 132 and coefficients of the DFE 148. The coefficients are representative of the ISI produced in the channel. Various numbers of coefficients may be applied in the channel estimate of equation (4). For example, some implementations of the ALCD circuit 156 may use 20 DFE taps, 3 FFE taps, and 5 DEQ taps to estimate channel response.

Figure 8B:
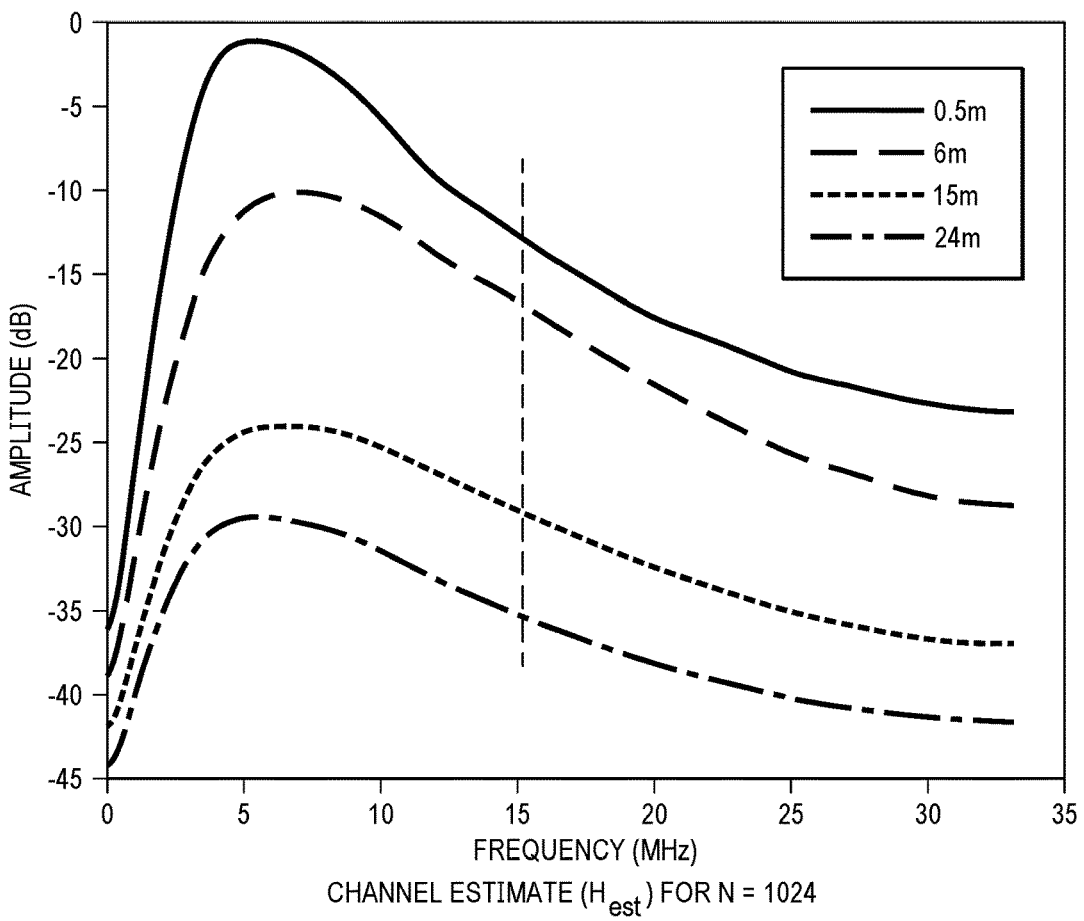

FIG. 8B shows an example of channel estimates computed using equation (4) with N=1024. Each curve of FIG. 8B is representative of the response for a different cable length. At a selected frequency the channel estimate is indicative of cable length. For example, with a 66 MHz symbol frequency ($F_s$), the frequency response at about $$15 \text{ MHz} \left( \text{about } \frac{Fs}{4} \right)$$

can be used to estimate cable length.

$$\frac{F_s}{4}$$

is in-band and can therefore be used to determine insertion loss, and allows for simplified computation as described below. Cable length estimation based on the channel estimates of equation (4) may provide cable length accuracy of about ±3 meters.

Some embodiments of the ALCD circuit 156 may optimize ALCD metric computation using the first DFE tap. The ALCD metric is a value that can be mapped to a cable length (e.g., the ALCD metric may be a monotonic curve with respect to cable length). In Ethernet channels, the first post-cursor ISI is dominant. Thus, some embodiments use only the first DFE tap to compute the ALCD metric. Insertion loss may be evaluated at one-quarter of the symbol frequency $$\left( \frac{F_s}{4} \right)$$

to simply DFT implementation, as the cosine and sine phasors at $$\frac{F_s}{4}$$

are [1, 0, −1]. The ALCD metric may be computed as:

$$ALCDMetric = \frac{DFT[1 + DFE1stTap] @ \frac{F_s}{4}}{(AnalogGain * DigitalGain) * DFT[DEQ] @ \frac{F_s}{4}} \quad (5)$$

Additionally, the ALCD circuit 156 may store the inverse response of the digital equalizer 130 in a look-up table to simplify computation of the ACLD metric. In such implementations, the ALCD metric of equation (5) may be simplified using log 2 calculation, a multiplier, and adders as:

$$ALCDMetric = \log_2 \left( \frac{1}{AnalogGain} \right) + \quad (6)$$

$$\log_2 \left( \frac{1}{DigitalGain} * [1 + DFE1stTap] \right) + \log_2 \left( InvDEQ @ \frac{F_s}{4} \right)$$

Figure 9A:
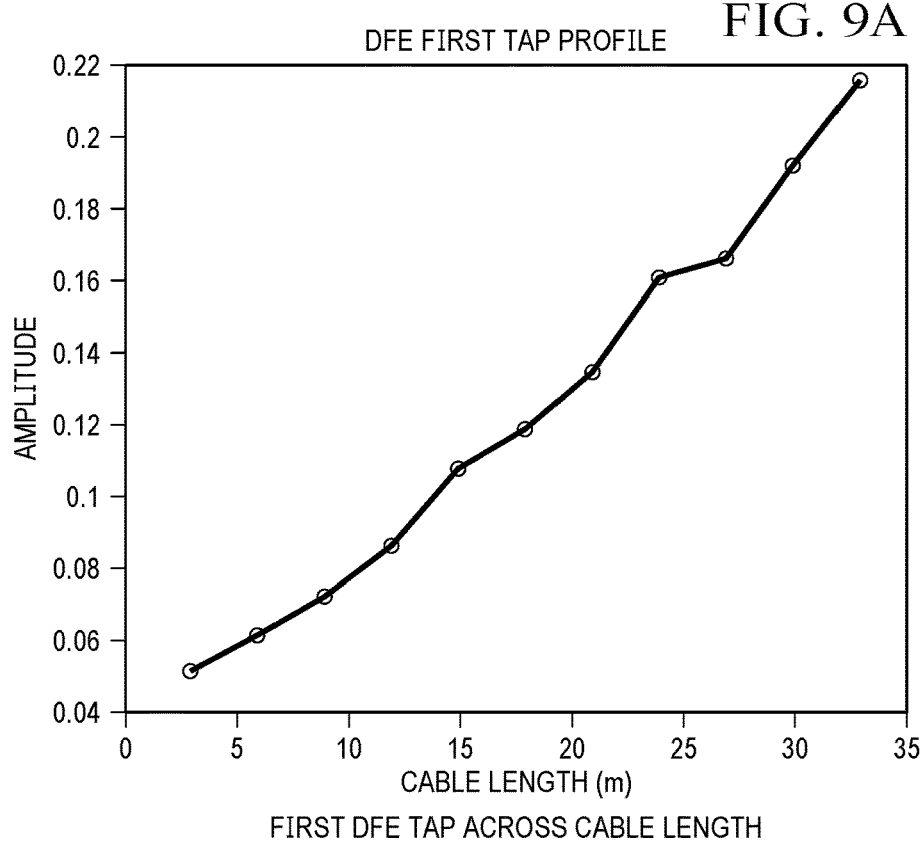
FIG. 9A is a graph of DFE first tap coefficient across cable length.

FIG. 9A is a graph of the coefficient value of the first tap 140 (y-axis, unitless) versus cable length (x-axis, in meters). FIG. 9A shows that the value of the first DFE tap is substantially related to cable length.

Figure 9B:
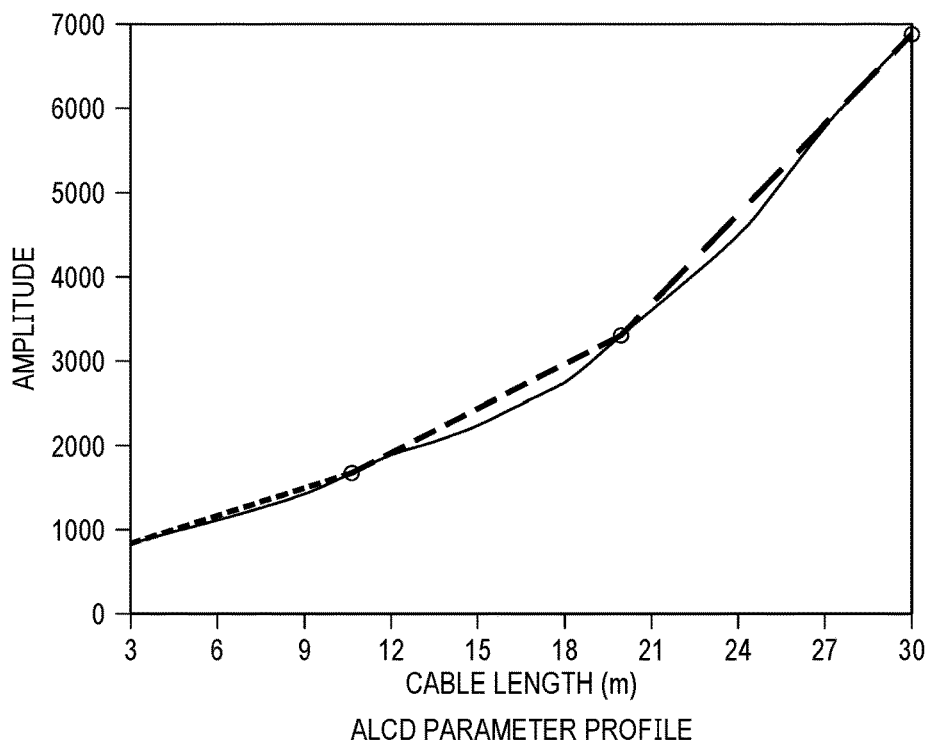
FIG. 9B is a graph of active link cable diagnostics (ALCD) parameter profile.

FIG. 9B is a graph of the unitless ALCD metric value (y-axis) versus cable length (x-axis, in meters). The ALCD metric may be computed per equation (6) based on gain, the first DFE tap, and the inverse digital equalizer response. FIG. 9B also shows a piecewise linear approximation of the ALCD metric in three segments. The ALCD circuit 156 may map values of the ALCD metric to cable length based on the linear segments. For example, cable length values are estimated (using linear interpolation) by applying the limits of a piecewise linear segment to values of the ALCD metric that fall within the segment. Implementations of the ALCD circuit 156 may apply any number of piecewise linear segments to estimate cable length.

Figure 9C:
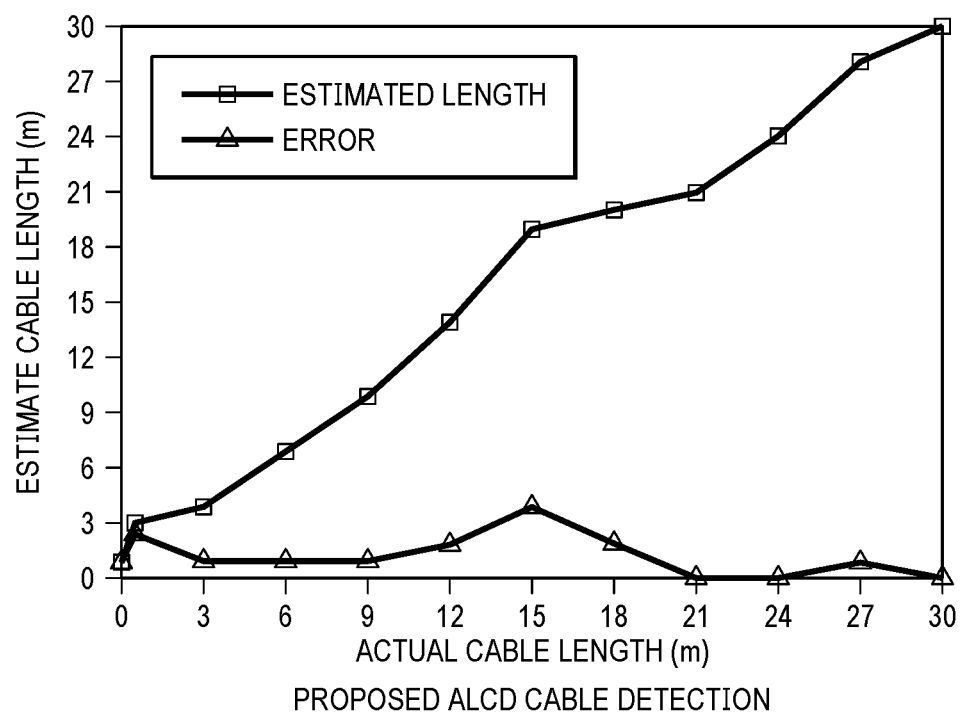
FIG. 9C is a graph of cable length error using the ALCD parameter profile of FIG. 9B.

FIG. 9C is a graph of estimated cable length (y-axis, in meters) versus actual cable length (x-axis, in meters), where estimated cable length is calculated using mapping based on the three piecewise linear segments of FIG. 9B.

Some embodiments of the ALCD circuit 156 may further simplify computational hardware by approximating the inverse response of the digital equalizer 130 using a 2-tap FIR filter of variable boosting function. In such an embodiment, the approximate inverse response of the digital equalizer 130 may be expressed as:

$$InvDeq(z) \cong 1 + a_1 z^{-1} \quad (7)$$

where $a_1$ is the coefficient of the second tap of the inverse DEQ filter.

The approximate inverse response of the digital equalizer 130 is convolved with the DFE 148 to estimate channel response.

$$conv[InvDeq(z), DFE(z)] \cong (1 + a_1 z^{-1}) * (1 + dfe_0 z^{-1}) \quad (8)$$

$$\cong (1 + (a_1 + dfe_0) z^{-1})$$

where $dfe_0$ is the coefficient of the first tap 140 of the DFE 148.

With this approximation, computation of the ALCD metric may be further simplified.

$$ALCDMetric \cong AnalogGain * DigitalGain * [1 + (a_1 + dfe_0)] \quad (9)$$

$$ALCDMetric \cong \log 2(AnalogGain) * \log 2(DigitalGain * (a_1 + dfe_0)) \quad (10)$$

Various embodiments of the receiver physical layer circuitry 100 may include the ALCD circuit 156 to provide cable length estimation as described herein with or without inclusion of the TED/DFE initialization described herein. Similarly, embodiments of the receiver physical layer circuitry 100 may include the TED/DFE initialization described herein with or without inclusion of the cable length estimation described herein.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party. Elements of some example embodiments, described above, may be implemented using analog circuitry (instead of or in addition to digital circuitry and/or software), digital circuitry (instead of or in addition to analog circuitry and/or software), a processor (instead of or in addition to analog circuitry, digital circuitry and/or software) and/or software (instead of or in addition to analog circuitry and/or digital circuitry). As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

Modifications are possible in the described embodiments, and other embodiments are possible, within the scope of the claims.

What is claimed is:

1. A receiver circuit, comprising:
   an analog-to-digital converter (ADC) including an output;
   a first adder including:
      a first input coupled to the output of the ADC;
      a second input; and
      an output;
   a second adder including:
      a first input coupled to the output of the first adder;
      a second input; and
      an output;
   a slicer including:
      an input coupled to the output of the second adder; and
      an output;
   a decision feedback equalizer (DFE) including:
      a first tap including:
         an input coupled to the output of the slicer; and
         an output coupled to the second input of the second adder;
      a second tap including:
         an input coupled to the output of the slicer; and
         an output coupled to the second input of the first adder;
   a timing error detector (TED), including:
      a first input coupled to the output of the slicer; and
      a second input; and
   a multiplexer, including:
      a first input coupled the output of the first adder;
      a second input coupled to the output of the second adder; and
      an output coupled to the second input of the TED.

2. The receiver circuit of claim 1, wherein:
   the multiplexer includes a control input; and
   the receiver circuit includes:
      a coarse automatic gain control (CAGC) circuit including:
         an input coupled to the output of the ADC; and
         an output coupled to the control input of the multiplexer.

3. The receiver circuit of claim 2, wherein:
   the ADC includes a signal input;
   the receiver circuit includes a low-pass filter having:
      an output coupled to the signal input of the ADC; and
      a corner frequency select input coupled to the output of the CAGC circuit.

4. The receiver circuit of claim 3, further comprising a sequencer circuit configured to cause the multiplexer to:
   route an output signal of the first adder to the TED responsive to the CAGC circuit selecting a gain value below a threshold to apply to an input signal at the signal input of the ADC; and
   route an output signal of the second adder to the TED responsive to the CAGC circuit selecting a gain value above the threshold to apply to the input signal at the signal input of the ADC.

5. The receiver circuit of claim 4, wherein:
   the sequencer circuit is configured to:
      set the low-pass filter to have a first corner frequency responsive to the CAGC circuit selecting the gain value below the threshold; and
      set the low-pass filter to have a second corner frequency responsive to the CAGC circuit selecting the gain value above the threshold;
      wherein the first corner frequency is lower than the second corner frequency.

6. The receiver circuit of claim 3, wherein:
   the TED is configured to select an offset value to add to a timing error value generated by the TED; and
   the offset value is selected to reduce a mean squared error of an output signal of the slicer.

7. The receiver circuit of claim 1, further comprising:
   a feed-forward equalizer (FFE) including:
      an input; and
      an output coupled to the first input of the first adder;
   a digital equalizer (DEQ) including:
      an input coupled to the output of the ADC; and
      an output coupled to the input of the FFE; and
   an active link cable diagnostics circuit coupled to the DFE, the FFE, and the DEQ, and configured to:
      compute a channel estimate based on coefficients of the DFE, coefficients of the FFE, and coefficients of the DEQ; and
      determine a cable length based on the channel estimate.

8. The receiver circuit of claim 1, further comprising:
   a digital equalizer (DEQ) including:
      an input coupled to the output of the ADC; and
      an output coupled to the first input of the first adder; and an active link cable diagnostics circuit coupled to the DFE, and the DEQ, and configured to:
compute an active link cable diagnostics (ALCD) metric based on coefficients of the DEQ and a coefficient of the first tap of the DFE.

9. The receiver circuit of claim 1, further comprising:
a digital equalizer (DEQ) including:
an input coupled to the output of the ADC; and
an output coupled to the input of the first adder; and
an active link cable diagnostics (ALCD) circuit including:
a finite impulse response (FIR) filter configured to estimate an inverse response of the DEQ;
wherein the ALCD circuit is coupled to the DFE, and configured to compute an ALCD metric based on a coefficient of the FIR filter and a coefficient of the DFE.

10. A receiver circuit, comprising:
an analog-to-digital converter (ADC);
a decision feedback equalizer (DFE) coupled to the ADC, and including:
a first tap; and
a second tap;
a slicer coupled to the DFE; and
a timing error detector (TED) coupled to the slicer, and configured to initialize timing of a sampling clock provided to the ADC while initializing the second tap of the DFE and holding the first tap of the DFE at a constant value.

11. The receiver circuit of claim 10, further comprising:
an automatic gain control circuit configured to apply a gain to an input signal provided to the ADC;
wherein the TED is configured to initialize the timing of the sampling clock while holding the first tap at a constant value responsive to the gain applied to the input signal being below a threshold.

12. The receiver circuit of claim 11, wherein the TED is configured to initialize the timing of the sampling clock while initializing the first tap of the DFE and the second tap of the DFE based on the gain applied to the input signal being above the threshold.

13. The receiver circuit of claim 11, further comprising:
a low-pass filter coupled to the ADC;
wherein the low-pass filter is configured to;
apply a first corner frequency based on the gain applied to the input signal being below the threshold; and
apply a second corner frequency, that is higher than the first corner frequency, based on the gain applied to the input signal being below the threshold.

14. The receiver circuit of claim 10, wherein the TED is configured to initialize the first tap after the timing of the sampling clock is initialized.

15. The receiver circuit of claim 10 further comprising:
a mean squared error (MSE) circuit coupled to the slicer and the TED, the MSE circuit configured to compute a mean squared error of the slicer; and
wherein the TED is configured to:
apply an offset to a timing error value applied to adjust the sampling clock; and
select a value of the offset based on an MSE value provided by the MSE circuit.

16. The receiver circuit of claim 10, further comprising:
a digital equalizer (DEQ) coupled to the ADC;
a feed-forward equalizer (FFE) coupled to the DEQ; and
an active link cable diagnostics (ALCD) circuit coupled to the DFE, the DEQ, and the FFE;
wherein the ALCD circuit is configured to:
compute a channel estimate based on coefficients of the DFE, coefficients of the FFE, and coefficients of the DEQ; and
determine a cable length based on the channel estimate.

17. The receiver circuit of claim 10, further comprising:
a digital equalizer (DEQ) coupled to the ADC; and
an active link cable diagnostics (ALCD) circuit coupled to the DFE and the DEQ;
wherein the ALCD circuit is configured to:
compute an ALCD metric based on coefficients of the DEQ and a coefficient of the first tap of the DFE.

18. The receiver circuit of claim 10, further comprising:
a digital equalizer (DEQ) coupled to the ADC; and
an active link cable diagnostics (ALCD) circuit coupled to the DFE and the DEQ;
wherein:
the ALCD circuit includes a finite impulse response filter configured to estimate an inverse response of the DEQ; and
the ALCD circuit is configured to compute an ALCD metric based on a coefficient of the FIR filter and a coefficient of the DFE.

19. A receiver circuit, comprising:
an analog-to-digital converter (ADC);
a decision feedback equalizer (DFE) coupled to the ADC;
a slicer having an input and an output, the input of the slicer coupled to the DFE via an adder and the output of the slicer coupled to an input of the DFE;
an automatic gain control (AGC) circuit coupled to the ADC, and configured to set an amplitude of an input signal provided to the ADC;
an active link cable diagnostics (ALCD) circuit coupled to the DFE and the AGC circuit, and configured to determine a cable length based on a gain value provided by the AGC circuit and a coefficient of the DFE;
a digital equalizer (DEQ) coupled to the ADC; and
wherein:
the ALCD circuit is coupled to the DEQ; and
the ALCD circuit is configured to compute an ALCD metric based on coefficients of the DEQ and a coefficient of a first tap of the DFE.

20. The receiver circuit of claim 19, further comprising:
a feed-forward equalizer (FFE) coupled to the DEQ; and
wherein:
the ALCD circuit is coupled to the DEQ and the FFE; and
the ALCD circuit is configured to:
compute a channel estimate based on coefficients of the DFE, coefficients of the FFE, and the coefficients of the DEQ; and
determine the cable length based on the channel estimate.

21. The receiver circuit of claim 19,
wherein:
the ALCD includes a finite impulse response (FIR) filter configured to estimate an inverse response of the DEQ; and
the ALCD circuit is configured to compute the ALCD metric based on a coefficient of the FIR filter and coefficients of the DFE.

22. A method, comprising:
digitizing a signal using an analog-to-digital converter (ADC);
initializing tap 2 through tap N (taps 2-N) of an N tap decision feedback equalizer (DFE) coupled to the ADC;

initializing ADC sample timing while initializing taps 2-N of the DFE; and initializing a first tap (tap 1) of the DFE after initialization of the ADC sample timing is complete.

23. The method of claim 22, further comprising:

applying a gain to the signal prior to digitization; and initializing ADC sample timing while initializing taps 2-N of the DFE responsive to the gain being less than a threshold gain.

24. The method of claim 23, further comprising:

low pass filtering the signal using a first corner frequency responsive to the gain being less than the threshold gain; and low pass filtering the signal using a second corner frequency responsive to the gain being greater than the threshold gain;

wherein the first corner frequency is lower than the second corner frequency.

25. The method of claim 22, further comprising:

computing a mean squared error of sliced output of the DFE; and selecting an offset to apply to a sample timing error value based on the mean squared error.

\* \* \* \* \*